United States Patent

[11] 3,563,228

[72] Inventor Maurice Seiderman
 3306 Derondo Drive, Hollywood, Calif. 90028
[21] Appl. No. 803,421
[22] Filed Feb. 28, 1969
[45] Patented Feb. 16, 1971

[54] PROCESS OF FORMING ADHERENT FILMS ON ANIMAL TISSUE
 6 Claims, No Drawings

[52] U.S. Cl.................................................. 128/1,
 3/1, 128/334; 204/181; 264/24, 264/222
[51] Int. Cl................................................... A61b 19/00
[50] Field of Search.......................................... 128/334,
 305.5, 335.5, 335; 3/1; 204/180, 181, (Inquired);
 117/(inquired); 18/5.1; 264/(Inquired), 24, 222

[56] References Cited
UNITED STATES PATENTS

| 3,443,261 | 5/1969 | Battista et al. | 128/1X |
| 3,454,966 | 7/1969 | Rosen............ | 3/13 |
| 3,491,760 | 1/1970 | Braun et al..... | 128/334 |

OTHER REFERENCES

"Adduct Detection Electrophoresis" G. Reich, Collagen Currents p. 249 Vol. 5, No. 6, Dec, 1964. Copy in Group 330

*Primary Examiner*—Dalton L. Truluck
*Assistant Examiner*—J. Yasko
*Attorney*—Herzig & Walsh

ABSTRACT: Animal tissue, such as bruised skin, skin graft removal sites, corneas, and the like are coated with a protective layer of undenatured collagen by electrophoretic migration of collagen particles from a suspension thereof in contact with the tissue. The layer thus formed is adherent, and in general becomes a part of the animal treated.

PROCESS OF FORMING ADHERENT FILMS ON ANIMAL TISSUE

This invention relates to coating animal tissue with collagen somewhat after the manner of a skin graft, but in a simplified and improved fashion utilizing suspensions of undenatured collagen.

The need frequently arises for coating animal tissue with a skinlike layer which in favorable cases becomes solidly attached on to the tissue in question. Skin grafts are of course well known, but to avoid rejection phenomena are generally taken from the same animal, and in addition are not employable in the case of certain specialized tissues, such as the cornea, where it is naturally essential that the graft become and remain transparent.

An object of the present invention is to provide a method of making a skin or tissue graft, whereby a layer of collagen is implaced on the tissue to be treated in such a fashion that it is adherent, dense, and skinlike.

Other objects of the invention will appear as the discussion thereof proceeds.

Generally speaking, and in accordance with illustrative embodiments of my invention, I commence with a suspension of comminuted undenatured collagen, as more particularly described herein below; and I bring this suspension into contact with the tissue to be treated. Where the treated area is very small, surface forces between the tissue and the electrode to be described are generally sufficient to maintain the suspension in place; and where larger areas are treated, it is a simple matter to form a dam surrounding the tissue to be treated, so that the suspension remains in place by gravity; or where the tissue to be treated forms part of an animal extremity, the later may simply be immersed in a container together with the suspension.

I then place a first electrode into electrical contact with the suspension, and preferably reasonably close to the tissue to be treated. Also, I place a second electrode in electrical contact with the animal, as by strapping it to any convenient part such as a hand or leg, for which the routine techniques of electrocardiography may be used. Then, I impress a voltage on the two electrodes, the first electrode being positive and the second electrode being negative. The suspended collagen particles are then acted upon by two essentially electrical forces: because they are themselves dipoles, they tend to become aligned with the lines of force of the electrical fluid; and second, because they possess an overall positive charge, they commence to migrate toward the treated tissue. When they reach the treated tissue, they are unable to migrate further, and a layer of collagen is built up which moreover is one having the collagen particles or fibrils aligned, so that a dense and adherent skinlike layer is formed and attached in intimate contact with the tissue.

The electrodeposition as described is carried out until a layer of desired thickness has been formed, whereupon the apparatus is removed from the animal treated. In general no subsequent treatment of the layer is needed, except to allow it to dry.

The preparation of the suspension of denatured collagen is known to the art. For example, bovine deep flexor tendon may be cleaned and trimmed of fat and other extraneous matter, then frozen, and sliced perpendicular to the longitudinal axis of the tendons, a suitable thickness being from 0.2 mm. 0.5 mm., although this is not critical. The collagen fibrils may then be disaggregated by treatment with a proteolytic enzyme such as commercial ficin, for example by gentle agitation for an hour at 35° C. in an aqueous solution of ficin. They are then washed with distilled water, and treated with 1 percent neutral aqueous sodium chloride solution for one hour in two successive treatments, added to a mixture of equal parts of methanol and water containing 2 percent cyanoacetic acid, agitated at near freezing, and then homogenized by a conventional homogenizer. However, many alternative procedures are known, such as that using aqueous carbonic acid solutions and fully described in U.S. Pat. No. 3,368,911.

A suitable collagen is that comminuted by the process of Battista (J. Appl. Polymer Sci. 11 481—498 (1967) ) and described in the article cited. The individual fibrils of this product are as short as one micron, or even somewhat shorter.

The suspension of comminuted undenatured collagen may be kept for some time before use, preferably in a refrigerator at close to freezing temperature. The electrodeposition, however, is carried out preferably at room temperature. Indeed, some local heating of the solution takes place as a result of the passage of the electrical current.

It will be apparent to those skilled in the art that the voltage and current requirements are quite dependent upon the dimensional parameters in any given treatment, such as the area to be coated with the adherent film of collagen, the area of the electrodes, the separation of the electrode from the animal tissue, and the mean temperature. It is desirable to provide a voltage supply variable over the range of about 1 to about 50 volts. The actual current requirements are of course small, generally measurable as a few millamperes. In general it is best to work at lower rather than higher voltages, which favors electrophoresis over electrolysis, some of the latter being inevitable although reducible to a minimum by avoiding the presence of electrolytes in the collagen suspension as far as possible. Also, working at relatively low voltages, and thus taking a relatively longer time such as a few minutes instead of a few seconds, to deposit the collagen film avoids an increase in temperature which, if carried too high, may commence to denature the collagen.

Collagen from many sources is suitable, such as mammalian collagen from sheep and horses. However, I prefer bovine collagen, because of its ready availability and quite general acceptability, that is nonrejection, by the animal host.

The comminution of the collagen refers, of course, to reduction in the length of the fibrils by the primary cutting process, since when placed into suspension the individual, elementary fibrils are separated from each another by the known techniques already described. Otherwise stated, the diameter of the fibrils is dependent only upon the source. As stated, a practical upper limit for their length of the comminuted fibril is 0.5 to 0.6 mm. The fibrils may of course be much shorter than this, limited only by the capability of the comminuting device or process used, and as mentioned, may be as short as a fraction of a micron.

The concentration of the collagen in the suspension is likewise variable within wide limits. Below about one-tenth percent by weight collagen in water leads to impracticably long deposition times, with repeated replenishment of the suspension being required. Suspensions more concentrated than 2 or 3 percent tend to become so viscous that migration of the particles is impeded. I have found suspensions of from 0.25 percent to 1 percent by weight best.

The thickness of the layer deposited on the animal tissue in accordance with the invention may be varied within wide limits. A thickness of less than 0.1 mm. is scarcely enough to achieve any practical result. Most frequently, thicknesses of about 0.2 to 0.5 mm. will be found suitable for most purposes.

An illustrative working example follows. The subject is a rabbit having a portion of the skin about 2 cm.$^2$ in area abraded from the foreleg. A one-half percent suspension of beef tendon collagen, sliced at 0.4 mm. fibril length is prepared using the ficin method described above. The entire foreleg is immersed in a tray containing the suspension, a contact electrode is placed on a hind foot, the electrode being dense graphite and using a 5 percent potassium chloride agar gel to obtain electrical conductivity. A dense graphite electrode, having a face 3 cm. in diameter, is maintained about 1 cm. from the abraded portion, immersed in the collagen suspension. A current is passed in the manner already described, using a voltage of about 5 volts, for 5 minutes, at the end of which time an adherent collagen film has been built up on the abraded portion. The foreleg is then rinsed free of unused collagen and dried in air.

A particular advantage of the process in accordance with the invention is that when an abraded portion of dermal tissue is treated, for example, the collagen fibrils deposited at the periphery of the abraded area tend to interlock with the "rough edges" of the intact collagen already present. Thus, not only does the deposited collagen layer adhere to the central portion of the tissue treated as already described, but there comes into play a very favorable mechanical effect of peripheral interlocking, which assists subsequent cicatrization.

While I have described my invention with the aid of various specific examples, it will be understood that I do not desire to be limited to the exact details described for obvious modifications will occur to persons skilled in the art.

I claim:

1. The process of coating animal tissue with a layer of collagen which comprises the steps of:
    placing a suspension of comminuted undenatured collagen in contact with said tissue;
    emplacing a first electrode in electrical contact with said suspension;
    emplacing a second electrode in electrical contact with said animal; and
    impressing a voltage between said electrodes, said first electrode being positive and said second electrode being negative, and maintaining said voltage until a preselected thickness of said layer is formed on said tissue.

2. The process in accordance with claim 1 wherein said collagen is mammalian.

3. The process in accordance with claim 1 wherein said collagen is beef tendon collagen.

4. The process in accordance with claim 1 wherein said collagen is present in the form of fibrils having a length of not to exceed about 0.6 mm.

5. The process in accordance with claim 1 wherein said tissue is dermal tissue.

6. The process in accordance with claim 1 wherein said tissue is corneal tissue.